May 16, 1967
R. H. JEBENS ETAL
3,320,137
MULTIFLASH DISTILLATION WITH RECYCLE OF
CONCENTRATE THROUGH UP-STREAM CONDENSER
AND FLASH STAGES
Filed March 23, 1964
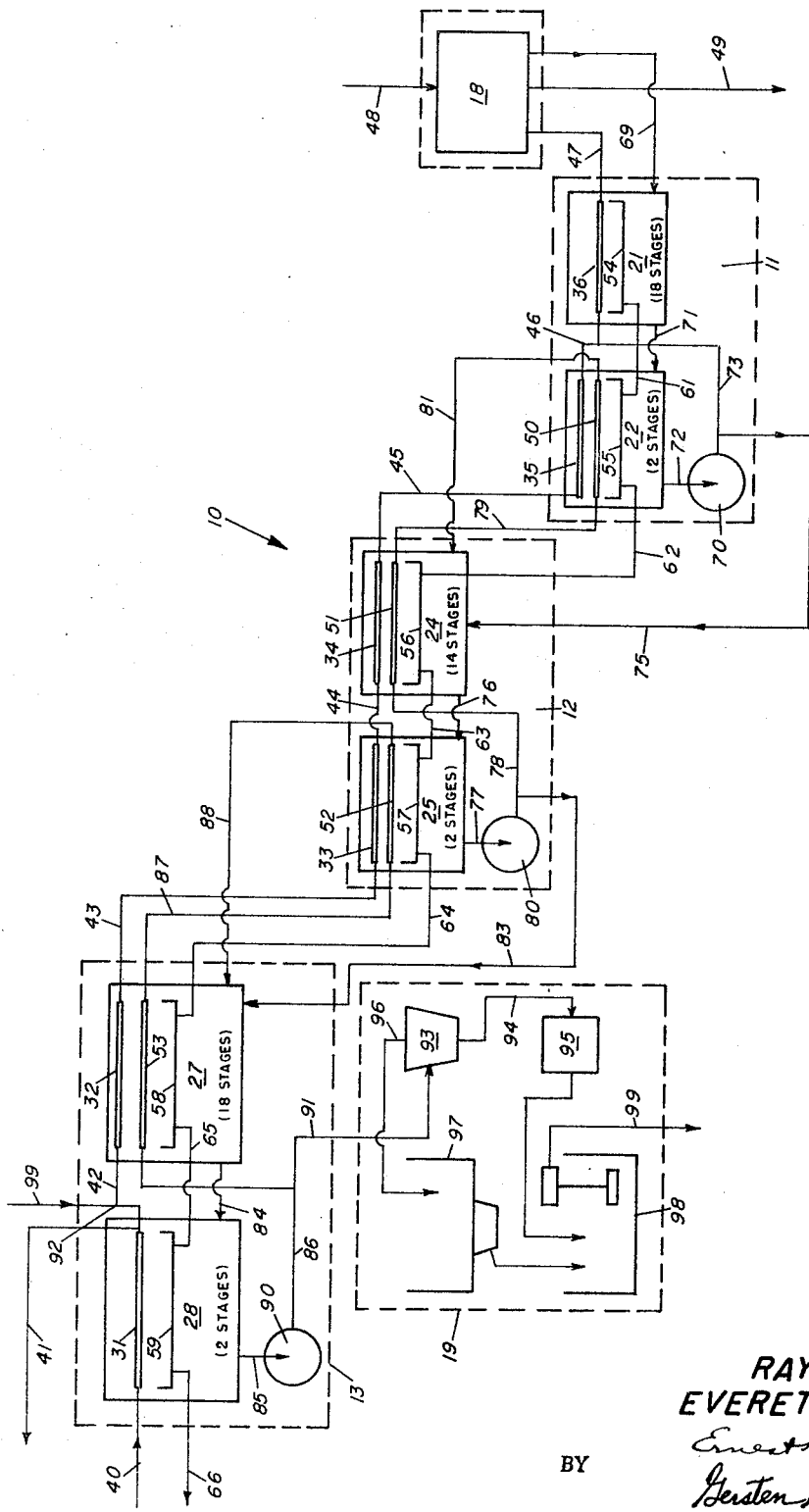
INVENTORS
RAY H. JEBENS
EVERETT N. SIEDER
BY
*Ernest Cohen*
*Gersten Sadowsky*
ATTORNEYS

United States Patent Office 3,320,137
Patented May 16, 1967

3,320,137
MULTIFLASH DISTILLATION WITH RECYCLE OF CONCENTRATE THROUGH UP-STREAM CONDENSER AND FLASH STAGES
Ray H. Jebens, Bethesda, Md., and Everett N. Sieder, McLean, Va., assignors to the United States of America as represented by the Secretary of the Interior
Filed Mar. 23, 1964, Ser. No. 354,507
4 Claims. (Cl. 202—173)

The invention herein described and claimed may be manufactured and used by or for the Government of the United States of America for governmental purposes without the payment of royalties thereon or therefor.

This invention relates to an improved liquid purification method and apparatus in which an impure liquid such as sea water is distilled by flash evaporation of the liquid after it is suitably heated. Utilization of the invention in the operation or the construction of a multiple-effect, multiple-stage flash evaporation system gains therefor an exceptional increase in pounds of product liquid produced for each pound of heating medium supplied, indicating a high thermal economy or gain ratio for such a system. Also procured is a significant lessening of scaling and its deleterious effects on heat transfer surfaces of the system. Heat supplied to the system is efficiently expended in accordance with the invention by heating incoming feed liquid in a once-through flow arrangement, and the effluent liquid passed between the system's distinct evaporation effects in a recycle inter-effect flow arrangement.

Multiple-stage flash evaporator apparatus has on occasion been advantageously used in large scale evaporation of sea water, or brine, and brackish water to produce purified water for agricultural and industrial needs as well as drinking purposes. However, the ultimate practicality such apparatus might have for converting saline water to fresh water depends mainly upon the extent to which its thermal economy may be improved. Therefore, the considerable improvement in thermal economy effectuated by the novel heating and reheating arrangements distinguishing the present invention make possible a wider utilization of multiple-stage flash evaporator apparatus for saline water conversion operations. Maximum heat economies have heretofore not been realized in flash evaporator apparatus because brine issuing from the low pressure stage of the usual singular effect of such apparatus was generally recirculated through nearly all the stages thereof. A system in which a procedure of this sort typifies the operation of apparatus previously known, is disclosed in Patent No. 3,119,752, issued Jan. 28, 1964, to A. Checkovich. According to the system of multiple evaporation effects constituting the present invention, heat rejected from any one effect is derived from only a relatively few stages at the low temperature end of the effect, and these rejection stages are arranged to compose a heat source for effluent brine received therethrough from the next lower pressure effect. Heat conservation is furthered in this manner since heat is effectively reclaimed from the effluent brine at essentially points in the system except at the low temperature heat reject stages of the lowest temperature and pressure effect. Moreover, since the individual effects in a multi-effect system are distinct structural parts thereof, it becomes feasible for each effect to have a substantial number of stages such that the total number of stages that can be adapted for use in such a system becomes relatively large, making possible system operation with an even greater economy ratio.

A principal object of the present invention is therefore to provide a liquid distillation process and apparatus in which multiple and interrelated liquid heating conditions are facilitated to permit evaporation procedures characterized by a high thermal economy.

A further object of the present invention is to provide a multiple effect, multiple stage evaporator having an arrangement of stages in each effect wherein the thermal efficiency of the evaporator is greatly improved by extensive recovery of heat from effluent liquid recycled between the effects.

A still further object of the present invention is to provide a scale inhibiting, multiple effect process and apparatus for improving the operation of a salt water distillation structure in which a relatively low concentration of impurities is maintained in the effluent salt water thereof present at high temperatures, and relatively higher concentration of impurities in the effluent salt water thereof present at lower temperatures.

These and other objects and advantages of the invention will be more clearly understood from the following description of a preferred embodiment of the invention considered together with the figure of the accompanying drawing. The flow diagram shown in this figure schematically illustrates a multiple effect, multiple stage flash evaporator structure in which effects and their stages are arranged and connected to cooperate in accordance with the present invention.

A sea water flash evaporator system 10, exemplary of the present invention, is generally illustrated in the figure of the drawing by a number of dash-line rectangles representing the system's first, second and third multiple-stage effects 11, 12 and 13, respectively. These effects are shown interconnected with each other, and as having joined thereto a primary heat source 18, and a slurry recovery and supply arrangement 19, by means of a multiplicity of lines depicting conduits through which flow the various fluid materials processed in the system. The manifold stages making up each effect are serially connected in a well known manner to facilitate the flow of feed brine from a source, such as the sea, through individual feed water heat exchangers provided in the upper portions of each stage, to move countercurrent to the flow of heated effluent brine leaving the primary heater and moving successively through the individual flash chambers of the stages. Essentially, the procedure involved is one of flash evaporation and condensation wherein the heated brine flows from the first stage of effect 11 whereat the effective temperature and pressure of the system are highest, to the last stage of effect 13, whereat the effective system temperature and pressure are lowest. The condensates formed, constituting the product water, are carried away in conduits connected to product water collector device suitably positioned under condensing structures in the stages. Further descriptions of multiple stage flash evaporators of this type are available in an article Saline Water Conversion by W. W. Rinne, in the Yale Scientific Magazine, vol. 37, No. 1, October 1962, an article by J. J. Strobel in the Desalination Research Conference Proceedings, National Academy of Sciences, National Research Council, Publication No. 942, published in 1963, and a Patent No. 2,759,882, to E. P. Worthen et al., issued Aug. 21, 1956.

According to the present invention, the multiple stages of each effect are grouped into two distinct operative sections. As indicated in the drawing, effect 11 is made up of an initial section 21 of many stages, and a further section 22 of a much lesser number of stages. The multiplicity of stages in effects 12 and 13 are similarly grouped into dual sections 24, 25 and 27, 28, respectively. The number of stages designated in each of the sections, as shown by the drawing, is by way of example only, it being obvious that the actual number of stages to be employed in either part of effects 11, 12 or 13, is determinable by design considerations such as temperature range and capacity for any particular system. Represented in the drawing by elongated narrow rectangles within the confines of the various sections are the bundles of tubes which furnish separate heat exchanger or condenser structures for the individual sections. As indicated by this showing, these structures are suitably arranged to span across groups of flash chambers constituted by the multiple stages of the several effects. A number of such heat exchangers 31 to 36, which are shown individually situated in the upper portion of the respective sections, are serially connected by a plurality of conduits 42 to 47 in which salt water, supplied from an input conduit 40, is fed to these heat exchangers so as to pass therethrough and eventually into primary heater 18. The connecting conduits actually carry a small part of the salt water arriving in conduit 40 since a major portion of this salt water functions only as a coolant for heat exchanger 31, and is released from the system in a conduit 41. Effect sections 22, 24, 25 and 27, are also provided with second condenser structures 50 to 53, respectively, which function for a purpose to be hereinafter more fully explained. Appropriately set up below the various heat exchangers and condensers in the individual sections, are tray-like structures 54 to 59 in which are collected the condensates produced from the flash evaporation. A further plurality of conduits 61 to 65 are provided to join trays 54 to 59 in a serial arrangement whereby the condensate in each section is added to the condensates of the preceding sections, and directed to pass through the effects and out of the system 10 in a terminal conduit 66.

Each effect is also provided with additional conduits wherein heated brine from a brine heater flows to the flash chambers of the effect's stages, and cooled brine from the low temperature stage of the effect is diverted to pass through several heat sources before the brine is reintroduced to the effect for further flash evaporation. Consequently, the input of heated brine to first effect 11, is traceable through a conduit 69 in which brine from heater 18 is delivered to section 21 of the effect. The heat source for this brine is steam circulated through pipes in heater 18 by way of conduits 48 and 49. In other conduits 71, 72 and 73, brine passes from section 22, through a pump 70, and mixes with the feed brine arriving in conduit 46, before flowing into the bundle of tubes constituting heat exchanger 36 of section 21, wherefrom the mixture passes through conduit 47 to enter the system's primary heater 18. Brine released from the low temperature, low pressure end of effect 11 is also received in a conduit 75 which conducts the brine to the flash evaporator stages in section 24 of second effect 12. Further conduits 76, 77 and 78, are arranged in effect 12 to channel brine from section 24 to the flash evaporator stages of section 25, thence through a pump 80, and into condenser 51 in section 24. Brine passing through condenser 51 flows therefrom in a conduit 79 which supplies this brine to condenser 50 in section 22 of the first effect. Thus, cooled brine leaving the low temperature, low pressure end of the second effect, is heated in condensers 51 and 50 before it passes into a conduit 81 and is reintroduced to the flash evaporator stages of the second effect.

In a similar arrangement, brine processed in sections 27 and 28 of the third effect, is recycled through two condenser structures whereby it absorbs an appreciable amount of heat before it is again processed in the third effect. Brine first received in the third effect stages of section 27, is supplied from the output at pump 80, through a conduit 83. Brine leaving section 27 is channeled through further conduits 84, 85 and 86, to pass within the flash evaporation stages of section 28, a pump 90, and from there to condenser 53 in section 27. After picking up heat in condenser 53, the brine flows through a conduit 87 and into condenser 52 in section 25 of the second effect where the brine receives additional heat before it passes into a conduit 88 for reintroduction to section 27 of the third effect. Since pump 90, as well as pumps 70 and 80, are each separately arranged for operation with respect to a different individual effect, adjustments thereto for controlling the circulation rate in an effect are easily made in a conventional manner to obtain for the effect the maximum heat recovery allowed by the temperature range and product recovery characteristics of such effect.

A portion of the brine leaving pump 90 is introduced by way of conduit 91, to the slurry feed and recovery arrangement 19. The high concentrations in this brine makes it particularly suitable for use in a secondary treatment of the incoming salt water feed. The primary feed treatment is the conventional pH control method requiring the addition of acid and the removal of carbon dioxide to hold pH relatively constant in the distillation process of the system. In the secondary treatment a slurry containing up to one percent concentration of calcium sulphate anhydrite is introduced into the feed stream at conduit connection 92. This slurry is obtained from arrangement 19 where the brine applied in conduit 91 is run through a liquid cyclone separator 93 such that the coarse crystals are drawn off at the bottom into a conduit 94 and supplied to a ball mill 95 which grinds them to a suitable size. The overflow from separator 93 is channeled through conduit 96 into a thickener 97 from which slurry is drawn off and mixed with the ball mill product in a mixer 98. The slurry is discharged from the mixer into a conduit 99 connected to the salt water feed line at 92, and the overflow brine from the mixer is sent to waste.

Ordinarily, the operation of any heat effect requires that a predetermined range of specified temperatures be maintained across the effect such that during continuing operation heat introduced thereto must be balanced by an equal heat transfer or loss from the effect. Aside from the usual operational losses in the effects, which are generally under ten percent, the heat supplied to brine flowing into the evaporation chambers of their stages is either recovered by the liquid passing through the tube bundles of the heat exchanger and condenser structures spanning the stages, or carried out of the effects in the brine discharged from those stages operating at their low temperature, low pressure ends. Accordingly, significant heat wastage or rejection from any effect is most likely to occur from the stages at its brine discharge end, whereas a substantially complete recovery of heat it possible from the other stages of the effect. By arranging an auxiliary condenser across the heat reject stages, as was heretofore explained, heat normally lost with the brine discharge is made available to heat brine received in the condenser from a lower temperature effect. Of the three reject sections 22, 25 and 28, shown in the drawing, the first two are equipped with the auxiliary condensers 50 and 52, whereby they function in heat recycle arrangement for the second and third heat effects 12 and 13, respectively. Consequently, condenser 50 in the first effect becomes a brine heater for the recirculating discharge from second effect reject section 25, which after flowing through conduit 78, condenser 51 in the second effect heat recovery section 24, passes through this brine heater, conduits 79 and conduit 81, to reenter and again be processed in the second effect. Similarly, condenser 52 in the second effect becomes a brine heater for the recirculating discharge from third effect reject section 28, flowing through conduit 86, condenser 53 and conduits 87 and 88. Since no auxiliary condenser in third effect reject section 28 recovers heat released therein, it is evident that the only major heat loss sustained in system 10, is through the coolant leaving the system in conduit 41.

It is now apparent that the heat economies engendered by the present invention are attributable to an arrangement wherein reject heat from the low temperature, low pressure stages of one effect becomes a significant heat source for the succeeding effect, and so on down to the last or lowest pressure effect, and the only external heat source is a brine heater operatively associated with the first or highest temperature and pressure effect. An essential difference between this arrangement and multiple flash evaporators used in the past, which might be comprised of the same number of stages as shown in the drawing for the three effects disclosed herein, is that in the present invention the system is apportioned into distinct evaporator effects individually having many stages whereas systems previously available are made up of only successive stages in a single effect. By reason of its unique arrangement, the present invention is enabled to provide an effective brine heater in each effect using only a small portion of its total number of stages. Moreover, as was hereinbefore explained, each of the effects of the present invention comprises a fundamentally separate multiple stage flash evaporator system with its separate brine recirculating arrangement, brine heater (in the reject stages of a higher pressure effect), heat recovery stages, and heat reject stages.

As a result of dividing the over-all system into distinct multiple effects, it becomes feasible to maintain a different concentration of impurities in the recirculation arrangement of each effect. Such flexibility in the control of concentration in turn allows the application of higher operating temperatures in the first or high pressure effect wherein a low concentration of impurities is maintained. With higher operating temperatures thus made practicable, the higher gain ratios previously noted can be realized in the operation of the over-all system. In this connection, passage of the product water condensed in high temperature and pressure effects to the product water trays of the next lower temperature and pressure effects also promotes the useful recovery and distribution of the heat supplied to the system.

Though the apparatus as presently disclosed is based on a system having one percent slurry in the feed stream, the existence of a particular concentration is not essential to the operation of a multi-effect, multi-stage arrangement. As explained in the Checkovich patent, previously noted, calcium sulfate in the slurry decreases as temperature is increased and concentration increases. Therefore, in the present invention higher temperatures are applicable for the initial flash in the first stage without undue calcium sulfate scale formation. The maximum flashing temperature of 225° F. to 250° F., referred to by Checkovich for a single effect evaporator with brine concentration of twice that of sea water, may be raised to 300° F. in a three-effect multi-stage arrangement producing brine concentration of twice that of sea water from the third effect. Under such arrangement the concentration in the first effect could be maintained at about 1.2 times that of sea water and temperatures up to 300° F. will not produce calcium sulfate on the evaporator surfaces. Consequently, with slurry of calcium sulfate present in the arrangement of about one percent concentration, temperatures over 300° F. can be used, and may range up to 400° F. With slurry forming in the lower temperature effects, the concentration factor is held high enough to precipitate more calcium sulfate on the seed slurry. As an example, the brine concentration circulating in the three effects may be 1.4, 2.4, and 6.0 times sea water concentration with the maximum flashing temperature of 300° F.

The capability in the invention to vary separately the concentration factor in each effect also gives rise to several additional advantages. As was heretofore indicated, it is important to maintain in the high temperature stages a low concentration factor and a low potential difference in concentration of scale forming ingredients to cause them to preferentially form on seeded crystals instead of heat transfer surfaces. The concentration factor can therefore safely be increased in the lower temperature effects until a maximum concentration factor realizable for the system decreases the feed quantity required thereby decreasing cost of pumping and anti-scaling compound additions. The brine discharge as blowdown is also decreased many fold making disposal easier and decreasing the heat loss to the waste stream. In addition, the more concentrated brine stream makes slurry recovery and separation easier and less costly. On the other hand, the control allowing a low concentration factor in the high temperature effects, reduces the deleterious effect of boiling point rise at high temperatures. Effective control of the concentration factor in each effect of the present invention, also allows its system to profitably use a scale prevention technique adapting ion-exchange resins in a recirculating system for the brine slurry from which the resins will be regenerated for further application.

Although the present disclosure is particularly concerned with a three effect arrangement wherein two heat reject sections are adapted to function as brine heaters, it is obvious that the teaching herein is applicable to distillation systems comprising many more effects. The number of stages in each effect, and the distribution of such stages into heat recovery and heat reject sections, may also be varied as required for any particular application of the system. However, when all necessary operational conditions of temperature approaches for an effect are met, and the same amount of condensing surface is available in each of its stages, a measure of the economy ratio that may be obtained is derived by dividing the number of heat recovery stages by the number of heat reject stages. A total economy ratio for the system is learned by adding all the values derived for the effects individually. Therefore, while a preferred structure and operating procedure for the invention have been illustrated and described herein, it is to be understood that the invention is not limited thereby, but is susceptible to change in form and detail.

What is claimed is:

1. In a multiple-effect multiple-stage flash distillation system including a plurality of heat effects comprising first, second and third heat effects having operative temperature gradients ranging progressively from a high to low condition, respectively, and each effect including a plurality of evaporation stages whose operative temperatures range progressively from high to low conditions, respectively, a first section in each effect having a major portion of said plurality of stages therein and comprising high temperature stages, and a second section in each effect having a minor portion of said plurality of stages therein and comprising low temperature stages, a primary heat exchanger arrangement operatively associated with each of said first and second sections, and connected successively for flow of feed distilland in a direction from the low to high temperature gradients to preheat the feed, means for elevating the feed to its highest temperature level after flow through said primary heat exchanger arrangement, means directing the feed as distilland successively through the first and second sections of the respective effects for flashing, the successive sections being at successively lower pressure and temperature for evaporation of a portion of the solvent distilland and condensation of the vapor in a vapor space in heat exchange with the primary heat exchanger arrangement, means for withdrawing a portion of the distilland from the second section of the respective effects, means operatively associated respectively with said second effect and each successive lower temperature effect for directing said portion through a second heat exchanger arrangement in the vapor space of the first section of the same effect from which it was withdrawn and then through a third heat exchanger arrangement in the vapor space of the second section of the effect up-stream in terms of distilland flow of the effect from which the portion was withdrawn, whereby vapors condense in said vapor spaces in heat exchange with said second and third heat exchangers, and means for recirculating the portion heated in the third heat exchanger arrangement to the first section of the effect from which the portion was withdrawn.

2. In the distillation system of claim 1, an effect at a lowest temperature condition of said plurality of heat effects having operatively associated therewith a means for discharging residual distilland, means for concentrating impurities in said residual distilland, and further means providing a flow path passing through said concentrating means in which residual distilland moves from said discharge means to said primary heat exchanger arrangement is treated to produce a slurry of predetermined concentration for introduction with input distilland to said evaporator stages.

3. The distillation system of claim 1 wherein said means for withdrawing a portion of the distilland from the second section of the respective effects includes a pump means, and further comprising conduit means connected to said pump means for directing a flow of part of said portion from said pump means to the first section of the effect downstream in terms of distilland flow of the effect from which the portion was withdrawn.

4. The distillation system of claim 1 further comprising a condensate collector means in each of said first and second sections of the respective effects, a product condensate outlet conduit means, and further conduit means interconnecting all said condensate collector means with said product condensate outlet conduit means.

No references cited.

NORMAN YUDKOFF, *Primary Examiner.*

F. E. DRUMMOND, *Assistant Examiner.*

Disclaimer 3,320,137.—*Ray H. Jebens*, Bethesda, Md., and *Everett N. Sieder*, McLean, Va. MULTIFLASH DISTILLATION WITH RECYCLE OF CONCENTRATE THROUGH UP-STREAM CONDENSER AND FLASH STAGES. Patent dated May 16, 1967. Disclaimer filed June 6, 1969, by the assignee, *United States of America as represented by the Secretary of the Interior*.

Hereby enters this disclaimer to claim 1 of said patent.
[*Official Gazette July 29, 1969*].